United States Patent
Caamano et al.

(10) Patent No.: US 7,216,659 B2
(45) Date of Patent: May 15, 2007

(54) LOW POWER SYSTEM FOR WIRELESS MONITORING OF AN ENVIRONMENT AND IRRIGATION CONTROL

(75) Inventors: Ramon Anthony Caamano, Gilroy, CA (US); Michael J. Lee, Center Ossipee, NH (US)

(73) Assignee: Great Stuff, Inc., Austin, TX (US)

( * ) Notice: Subject to any disclaimer, the term of this patent is extended or adjusted under 35 U.S.C. 154(b) by 61 days.

(21) Appl. No.: 11/174,152

(22) Filed: Jun. 30, 2005

(65) Prior Publication Data

US 2006/0054214 A1    Mar. 16, 2006

Related U.S. Application Data

(60) Provisional application No. 60/584,892, filed on Jun. 30, 2004.

(51) Int. Cl.
 *A01G 25/16* (2006.01)
 *G05D 7/00* (2006.01)

(52) U.S. Cl. .................. 137/1; 137/78.3; 251/129.04; 700/284; 239/63; 239/64; 239/69

(58) Field of Classification Search ............... 137/78.3, 137/1; 251/129.04; 239/63, 64, 69, 70; 700/284
See application file for complete search history.

(56) References Cited

U.S. PATENT DOCUMENTS

| | | | |
|---|---|---|---|
| 4,256,133 A | 3/1981 | Coward et al. | |
| 4,333,490 A | 6/1982 | Enter, Sr. | |
| 4,396,149 A | 8/1983 | Hirsch | |
| 4,852,802 A | 8/1989 | Iggulden et al. | |
| 5,385,297 A | 1/1995 | Rein et al. | |
| 5,445,178 A | 8/1995 | Feuer | |
| 5,465,904 A * | 11/1995 | Vaello | 239/69 |
| 5,647,388 A | 7/1997 | Butler, Jr. et al. | |
| 5,696,671 A | 12/1997 | Oliver | |
| 5,740,031 A | 4/1998 | Gagnon | |
| 5,749,521 A | 5/1998 | Lattery | |
| 5,760,706 A * | 6/1998 | Kiss | 340/825.69 |
| 5,870,302 A | 2/1999 | Oliver | |
| 5,927,603 A | 7/1999 | McNabb | |
| 6,257,264 B1 | 7/2001 | Sturman et al. | |
| 6,312,191 B1 | 11/2001 | Rosenfeld | |
| 6,452,499 B1 | 9/2002 | Runge et al. | |
| 6,453,215 B1 * | 9/2002 | Lavoie | 700/284 |
| 6,823,239 B2 * | 11/2004 | Sieminski | 700/284 |
| 6,906,638 B2 * | 6/2005 | Gaiser | 340/870.07 |
| 7,050,887 B2 * | 5/2006 | Alvarez | 700/284 |
| 7,058,478 B2 * | 6/2006 | Alexanian | 700/284 |
| 7,069,115 B1 * | 6/2006 | Woytowitz | 700/284 |
| 7,096,094 B2 * | 8/2006 | Addink et al. | 700/284 |

(Continued)

*Primary Examiner*—A. Michael Chambers
(74) *Attorney, Agent, or Firm*—Knobbe Martens Olson & Bear LLP

(57) ABSTRACT

The present invention relates to a system and components thereof for intelligently watering an environment. The system comprises at least one sensor for monitoring particular environmental conditions, and at least one electrically powered valve that receives wireless information signals from the sensor and controls a watering device based on the signals. Power control units repeatedly toggle the sensor and valve between powered and unpowered states to conserve energy. The power control units are configured so that the powered states of the sensor and valve overlap in time to make it possible for the valve to receive the wireless information signals from the sensor.

21 Claims, 13 Drawing Sheets

U.S. PATENT DOCUMENTS

| | | |
|---|---|---|
| 2003/0109964 A1 | 6/2003 | Addink et al. |
| 2004/0078092 A1* | 4/2004 | Addink et al. ................ 700/1 |
| 2004/0089346 A1 | 5/2004 | Sutardja |
| 2004/0100394 A1 | 5/2004 | Hitt |
| 2004/0217189 A1* | 11/2004 | Regli .......................... 239/69 |

* cited by examiner

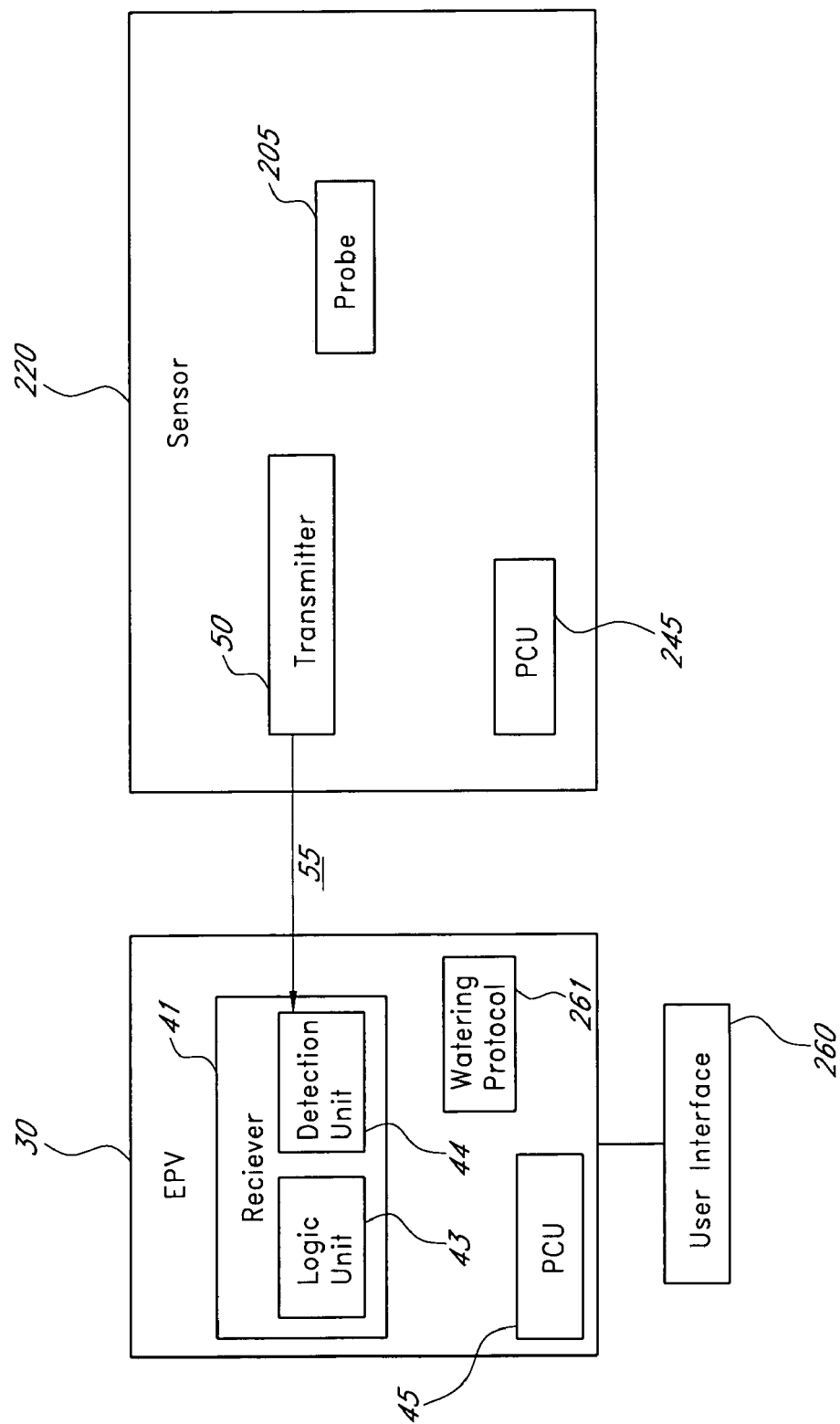

LOW POWER SYSTEM FOR WIRELESS MONITORING OF AN ENVIRONMENT AND IRRIGATION CONTROL

RELATED APPLICATIONS

This application claims priority to U.S. Provisional Application No. 60/584,892, filed Jun. 30, 2004, herein incorporated by reference in its entirety.

FIELD OF THE INVENTION

The present invention relates generally to irrigation systems that operate based on monitored environmental conditions and specifically to methods of reducing power consumption in such systems.

BACKGROUND

Commercial watering systems (e.g., residential sprinkler systems) deliver water to an area relatively indiscriminately. This often leads to under- or over-watering. This can also lead to flooding of the watered area or, if the area is porous, to insufficient amounts of water being delivered to the area. Some systems address this problem by placing the watering system on a programmed timer, whereby different regions of the watered area receive water for different durations of time.

It has been proposed to use wireless sensors (e.g., soil moisture sensors) to monitor an environment and then use information detected by the sensors to water the environment in an automated fashion. Typically, the monitors send wireless signals to a controller that in turn operates a plurality valves based on the detected information. These systems typically employ valves that are hard wired for electrical control by the controller. The sensors are normally powered by conventional batteries or solar cells.

SUMMARY OF THE INVENTION

Wireless sensors that constantly monitor an environment and send wireless information detected from the environment require significant power. Batteries that power the sensors often drain somewhat quickly. As a result, systems that use wireless devices are costly and require frequent maintenance. The present disclosure solves this problem by providing a watering system that wirelessly monitors and waters an area while consuming less power than existing systems.

In one aspect, a system for wirelessly monitoring and watering an area is provided. The system comprises one or more electrically powered sensors configured to be deployed in the area, and one or more electrically powered valves configured to be connected to a network of irrigation conduits deployed in the area. Each sensor comprises a probe configured to measure an aspect of the sensor's environment, a transmitter configured to transmit a wireless signal containing measurements received from the probe, and a sensor power control unit configured to repeatedly toggle componentry of the sensor between powered and unpowered states. The valve comprises a fluid inlet and a fluid outlet, a fluid flow path being defined between the inlet and outlet. The valve also comprises an electrically actuated flow restrictor movable to selectively open or close the flow path, a receiver configured to receive the wireless signals sent from the one or more sensors, and a valve power control unit configured to repeatedly toggle componentry of the receiver between powered and unpowered states. At least one sensor power control unit and at least one valve power control unit are configured to produce overlaps of the powered states of their associated sensor and valve so that the valve's receiver can receive wireless signals from the sensor's transmitter during the overlapping powered states.

In another aspect, a method for wirelessly monitoring and watering an area is provided. The method comprises providing a sensor configured to detect an environmental condition and transmit wireless signals associated with the detected condition; providing an electrically powered valve configured to receive the signals and control flow to a watering unit in the area; toggling componentry of the sensor between powered and unpowered states; toggling componentry of the valve between powered and unpowered states; causing time overlaps of the powered states of the sensor and the valve; and sending the signals from the sensor to the valve during the time overlaps.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 3 is a schematic of an EPV and a sensor according to an alternative embodiment of the invention.

DETAILED DESCRIPTION OF THE PREFERRED EMBODIMENT

The low power watering systems disclosed herein contain wireless electrically powered valves (EPVs) and wireless sensors that cooperate to provide water to an area. In some embodiments, each sensor is configured to send information or commands to an EPV, which in turn controls a watering unit (e.g., a sprinkler) that delivers water to a subregion that contains the sensor. While the EPVs and sensors operate on limited power sources (e.g., conventional batteries), power requirements are substantially reduced by the use of power control units ("PCUs") that efficiently toggle the EPVs and sensors between powered and unpowered states. Power is thus conserved because these components are not continuously powered. Preferably, each component (EPV or sensor) includes one PCU that controls its toggling between powered and unpowered states.

In one embodiment, the system uses EPVs of the type described in U.S. Patent Application Publication No. US 2004/0231723 A1, the entirety of which is hereby incorporated by reference herein. In a preferred embodiment, the power savings is achieved by configuring the PCUs so that the powered states of the EPV and sensor temporally overlap (i.e., overlap in time) to permit the successful transmission of a wireless signal from the sensor to the EPV. This can be achieved in a variety of ways.

For example, the EPV can be configured to be powered for a short interval occurring three times a second. In other words, the EPV "looks" for a signal three times a second. An associated sensor can be configured to transmit its signal periodically (e.g., once every minute) for a full second to ensure that the EPV receives the signal over three of its cycles. In toggling between powered and unpowered states, both devices (the EPV and sensor) can be configured to be unpowered for a very large percentage of each cycle, thus increasing power savings.

Figure 1:
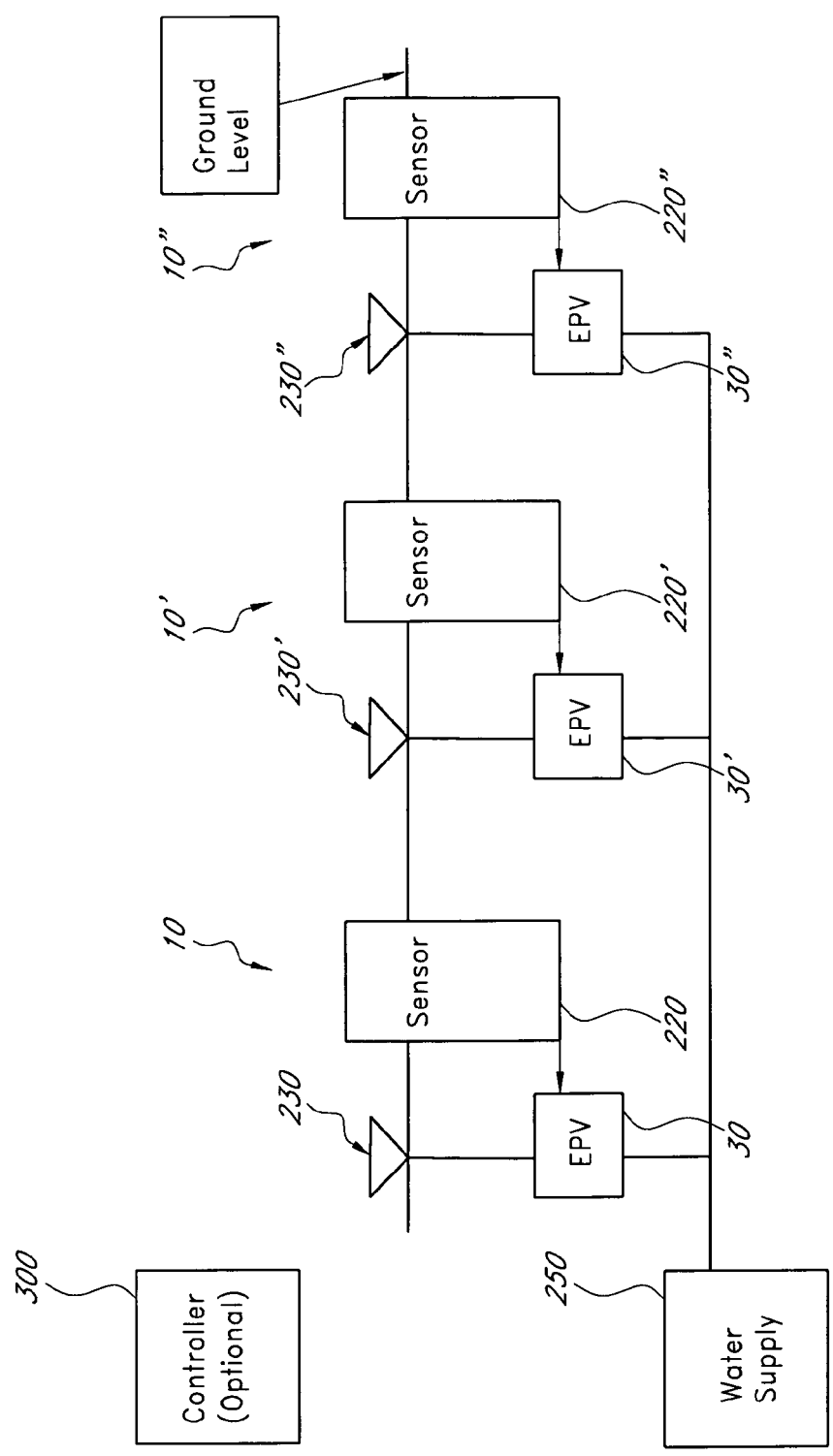
FIG. 1 is a schematic of one possible embodiment of the system involving an optional controller, wireless sensors, and electrically powered valves.

FIG. 1 schematically illustrates a deployment of a low power monitoring and watering system according to one embodiment of the invention. The system includes a plurality of watering stations or subregions 10, 10', 10", etc, each of which defines a specific subregion of the entire watered area. The watered area may include plants, trees, shrubs, bushes, grass, etc. Each station 10 includes an EPV 30, one or more sensors 220, and a watering unit 230 (e.g., a sprinkler). In a preferred embodiment, there is only one sensor 220 per station 10. However, for ease of description, each station 10 is hereinafter described as if it included only one sensor 220. Also, the following text describes the operation of a single station 10. However, it will be understood that each of the stations 10, 10', 10", etc. can operate as described. In the illustrated embodiment, the EPVs 30 are buried underground, the sensors 220 are partially buried, and the watering units 230 are primarily above ground.

Each EPV 30 controls the flow of water from a water supply 250 to the associated watering unit 230. Each EPV 30 is configured to receive wireless information from its associated sensor 220, the information comprising detected conditions of the watered subregion 10. The EPV 30 controls the water flow to its associated watering unit 230 based on the information received from the sensor 220. The system can also include an optional controller 300 that receives information from the sensors 220 to allow a user to monitor the conditions in the watered environment. The controller 300 can also be configured to allow the user to send commands to the sensors 230 and/or EPVs 30, for example to adjust watering protocols.

Figure 2A:
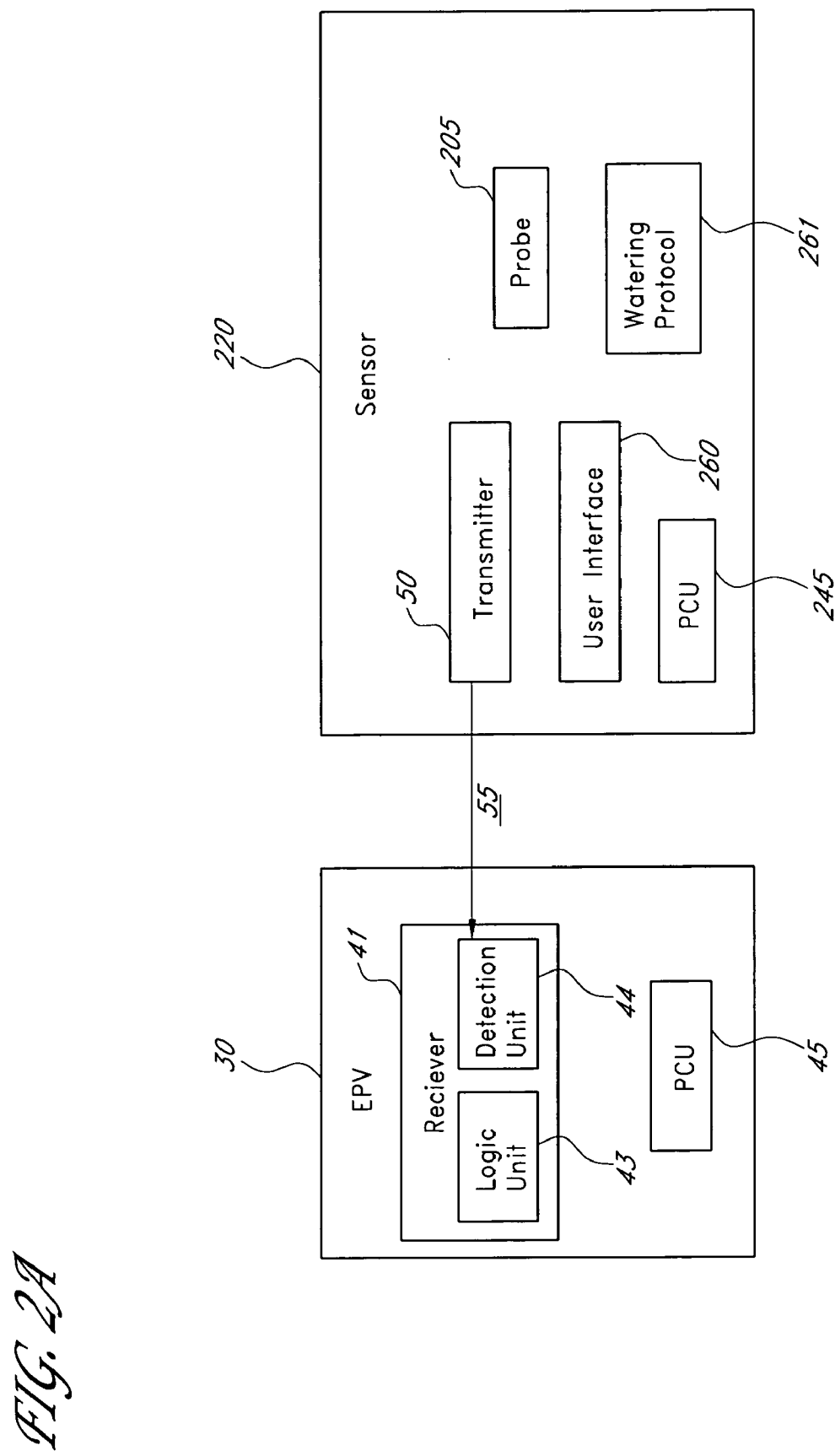
FIG. 2A is a schematic an EPV and a sensor constructed in accordance with an embodiment of the invention.

FIG. 2A depicts one embodiment of an EPV 30 and sensor 220 at one station 10. The sensor 220 sends detected environment information to the EPV 30 in the form of wireless signals 55. Based on the received signals 55, the EPV 30 controls the amount of water delivered to the subregion 10, by opening or closing the water flow path to the watering unit 230.

A. Sensor

In the embodiment depicted in FIG. 2A, the sensor 220 contains a probe 205 that is configured to detect and/or measure an environmental condition near the sensor. Examples of measurable conditions are, without limitation, moisture content in the soil (for example by measuring the resistance between two electrodes), rate of solar energy received (or absolute amount in any specified time period), soil temperature, air temperature, presence of fertilizer, air humidity, whether it is currently raining or whether water is being received, the time period since water was last received, and any other measurement that one of skill in the art will recognize as relevant in the watering of an area. The sensor 220 is preferably partially deposited within the soil of the subregion 10. Suitable probes 205 are sold by Decagon (website www.decagon.com).

The sensor 220 includes a transmitter 50 for sending wireless signals to the EPV 30 regarding the environment around the probe 205. The signals can be, for example, raw data or command instructions for the EPV 30. The sensor 220 further includes a user interface 260 that allows a user to enter a watering protocol 261 that is stored in the sensor. An exemplary user interface 260 might include an LCD panel with a few controls for adjusting desired parameters of the protocol. For example, a watering protocol 261 can be an instruction to deliver water whenever the soil moisture level is below a specified threshold. The sensor 220 is configured to compare a measured environmental condition (such as soil moisture) in the subregion 10, as detected by the probe 205, to a desired amount of said environmental condition, as entered in the watering protocol 261. This allows the sensor 220 to determine whether additional water is required for the subregion 10 and, if necessary to meet the watering protocol 261, to send a wireless command signal to the EPV 30 to permit water flow to the watering unit 230. The watering protocol 261 may be used by a logic unit or processing unit that compares the actual environment to the desired environment parameters and determines whether to provide additional water to the subregion 10.

The sensor 220 also includes a PCU 245 that repeatedly toggles the sensor (or just some of the components of the sensor) between powered and unpowered states. For example, the PCU 245 can toggle power to the probe 205, the transmitter 50, the user interface 260, the entire sensor, or subcombinations of these components. In a preferred embodiment, the toggling occurs in a repeating temporal cycle. As will be appreciated by one of skill in the art, toggling power to componentry of the sensor (or the EPV 30) may or may not include toggling power to the PCU 245. As explained in more detail below, the PCU allows the sensor 220 to consume less power than it would otherwise consume.

Various embodiments of probes 205 can be used. For example, the probe 205 can detect the amount of moisture in the ground by determining the dielectric of the ground around the probe. Alternatively, the probe 205 can contain a moisture absorbing material that displays an altered characteristic once it absorbs water, e.g., a block of material that expands in the presence of moisture.

As described above, the sensor 220 can monitor the moisture of the soil and compare it to a programmed threshold or desired moisture level. In some embodiments, the sensor or EPV can be programmed to feed additional ingredients into the water flow (e.g., activation of a supplemental valve that introduces fertilizer into the water lines). In some embodiments, the sensor includes a photocell or other apparatus to determine if it is day or night, for example to prevent watering at undesirable times.

The watering protocol 261 defines the parameters for how the EPV 30 regulates water flow to its associated watering unit 230. For example, the protocol 261 can specify that the EPV 30 begin watering the subregion 10 when the soil moisture is below a threshold, when the air humidity is below a threshold, never during daytime, etc. Skilled artisans will appreciate that there is wide flexibility in the form, scope, and applicability of the protocol 261. The watering protocol 261 is preferably programmable by a user from the user interface 260 of the sensor 220, or by a user interface at the EPV 30 or controller 300.

B. EPV

FIG. 2A further depicts an EPV 30. The EPV 30 contains a receiver 41 for receiving signals from the sensor 220, and a PCU 45 that similarly controls the receiver's powered and unpowered states. The sensor 220 sends wireless commands 55 to the receiver 41 to regulate water to the watering unit 230.

The illustrated wireless receiver 41 comprises a detection unit 44, such as a RF receiver integrated circuit (IC) chip, configured to detect incoming wireless signals. Additionally, the illustrated receiver 41 comprises a logic unit or circuit 43, which is configured to analyze and decode incoming wireless signals 55 detected by the detection unit 44 and determine how to respond, if at all. It will be appreciated that the logic unit 43 can be separate from the receiver 41.

Figure 2B:
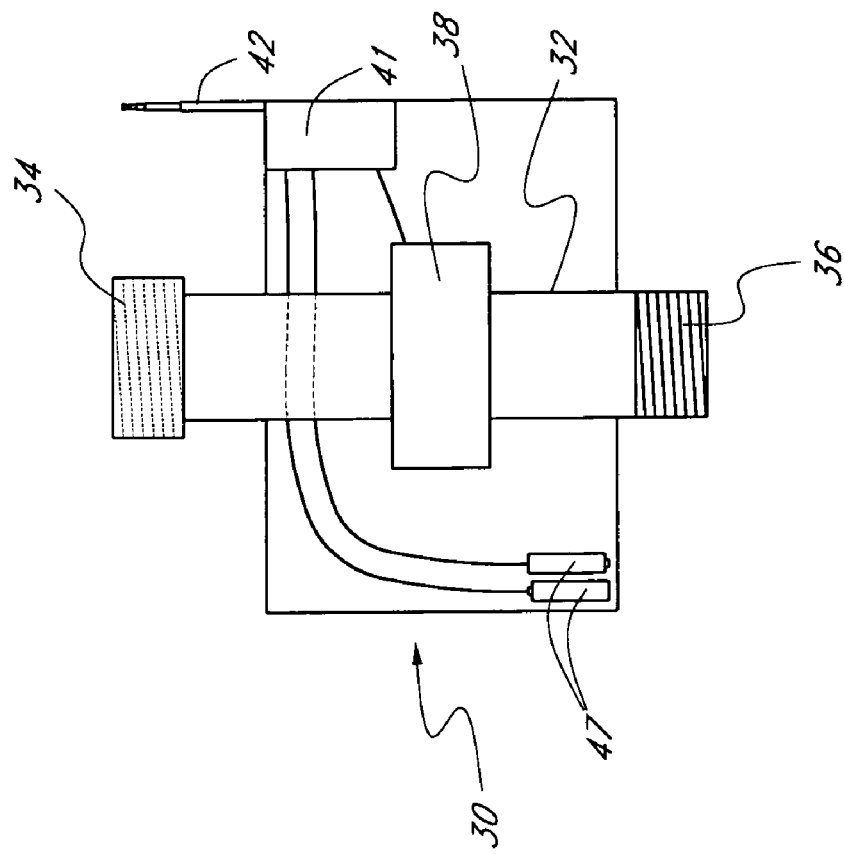
FIG. 2B is a schematic of one embodiment of an EPV.

As described above, the electrically powered valve 30 controls the flow of water therethrough and is controlled electrically. One embodiment of the EPV 30 is shown in FIG. 2B. The illustrated EPV 30 defines a fluid flow path 32 from an inlet 34 to an outlet 36. Along the flow path 32 an electrically actuated flow restrictor 38, such as a solenoid device, selectively permits or inhibits flow therethrough. A suitable EPV 30 is the flow controller described in U.S. Patent Application Publication No. US 2004/0231723 A1.

In FIG. 2B the electrically powered valve 30 includes the wireless receiver 41 configured to receive wireless signals from the transmitter 50, and possibly also from other sources like a remote control. The receiver 41 may include an antenna 42. Examples of communication methods include infrared (IR) and radio frequency (RF) communications. In situations in which the EPV is underground and the wireless signals 55 cannot travel through the earth, the antenna 42 can extend above ground to receive the signals.

The receiver 41 is preferably configured to communicate electrically with the flow restrictor 38, so that the electrical signals 55 can be converted into movement of the flow restrictor 38 to open or close the flow path 32. The detection unit 44 and the logic unit 43 need not be physically located within a single housing or receiver 41.

The power control unit 45 toggles the EPV 30 (or components thereof) between powered states and unpowered states so that the entire device need not be constantly powered. The PCU 45 can control power to the entire EPV 30, the receiver 41, the logic circuit 43, the detection unit 44, or some combination thereof. As described in more detail below, the toggling reduces power consumption of the EPV 30. Moreover, the PCU 45 effects a temporal overlap of powered states of the sensor 220 and EPV 30, facilitating wireless communication therebetween despite their toggling. In a preferred embodiment, the toggling occurs in a repeating temporal cycle.

While illustrated as an external component, antenna 42 can alternatively be incorporated within the housing of the electrically powered valve 30. Also illustrated in FIG. 2B is a self-contained DC power source in the form of batteries 47. It will be understood that the electrically powered valve 30 can alternatively be powered by AC current from an electrical outlet, or by solar cells or the like. However, battery and perhaps solar power is preferred over AC power from a city supply due to the difficulty of laying power cables underground for the valves 30.

In another embodiment, the logic unit 43 is external to the receiver 41. This logic unit 43 could be an Application-Specific Integrated Circuit (ASIC), or a standard IC decoder unit. The logic unit 43 can be unpowered when it is not needed.

FIG. 3 depicts an alternative embodiment of an EPV 30 and sensor 220 at one station 10, in which the user interface 260 and watering protocol 261 reside with the EPV 30. In this embodiment, the sensor contains a transmitter 150, a probe 205, and a PCU 245 as described above. Wireless signals 55 from the sensor are sent to the EPV 30, which detects the signal with a receiver 41 (again containing a detection unit 44 and a logic unit 43) and includes a PCU 45. The user interface 260 can but need not be included in the main body or housing of the EPV 30. As above, the PCUs 45 and 245 allow the system to conserve power. Additionally, the EPV 30 and sensor 220 can include any of the other aspects discussed herein.

Figure 4:
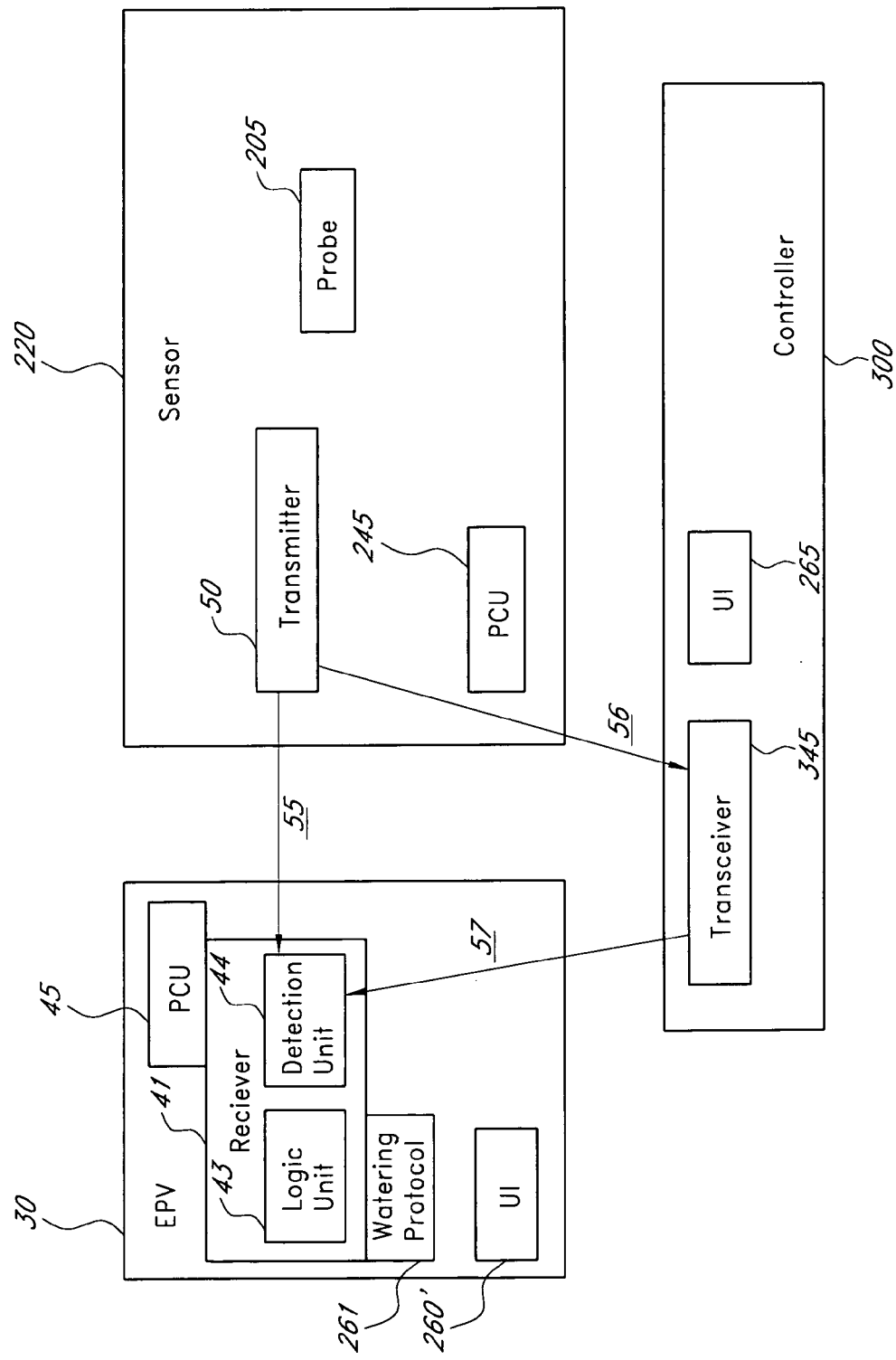
FIG. 4 is a schematic of an EPV and a sensor according to an alternative embodiment of the invention.

FIG. 4 depicts another embodiment of a low power monitoring and watering system. In this embodiment, each sensor 220 communicates with both a controller 300 and an EPV 30. The sensor 220 includes a PCU 245, a probe 205 and a transmitter 50. In this embodiment, the transmitter 50 sends not only a signal 55 to the EPV 30, but also a signal 56 to the controller 300 (discussed in more detail below). The controller 300 includes a user interface 265 that allows users to monitor the conditions detected by the sensors 220 and, preferably, to adjust the watering protocol 261 via wireless control signals 57. The controller 300 additionally includes a transceiver 345 that receives the signals 56 from the transmitter 50 and sends the signals 57 to the receiver 41. The EPV 30 contains the watering protocol 261, the receiver 41, a PCU 45, and another user interface 260. It will be understood that one of the user interfaces 260, 265 can be omitted from the system. In some embodiments, the controller 300 includes a PCU that toggles the controller between powered and unpowered states to achieve power savings as described above. However, it is expected that the controller 30 will more often be powered by a continual AC power source such as a municipal power supply, which makes the power savings less important.

Figure 5:
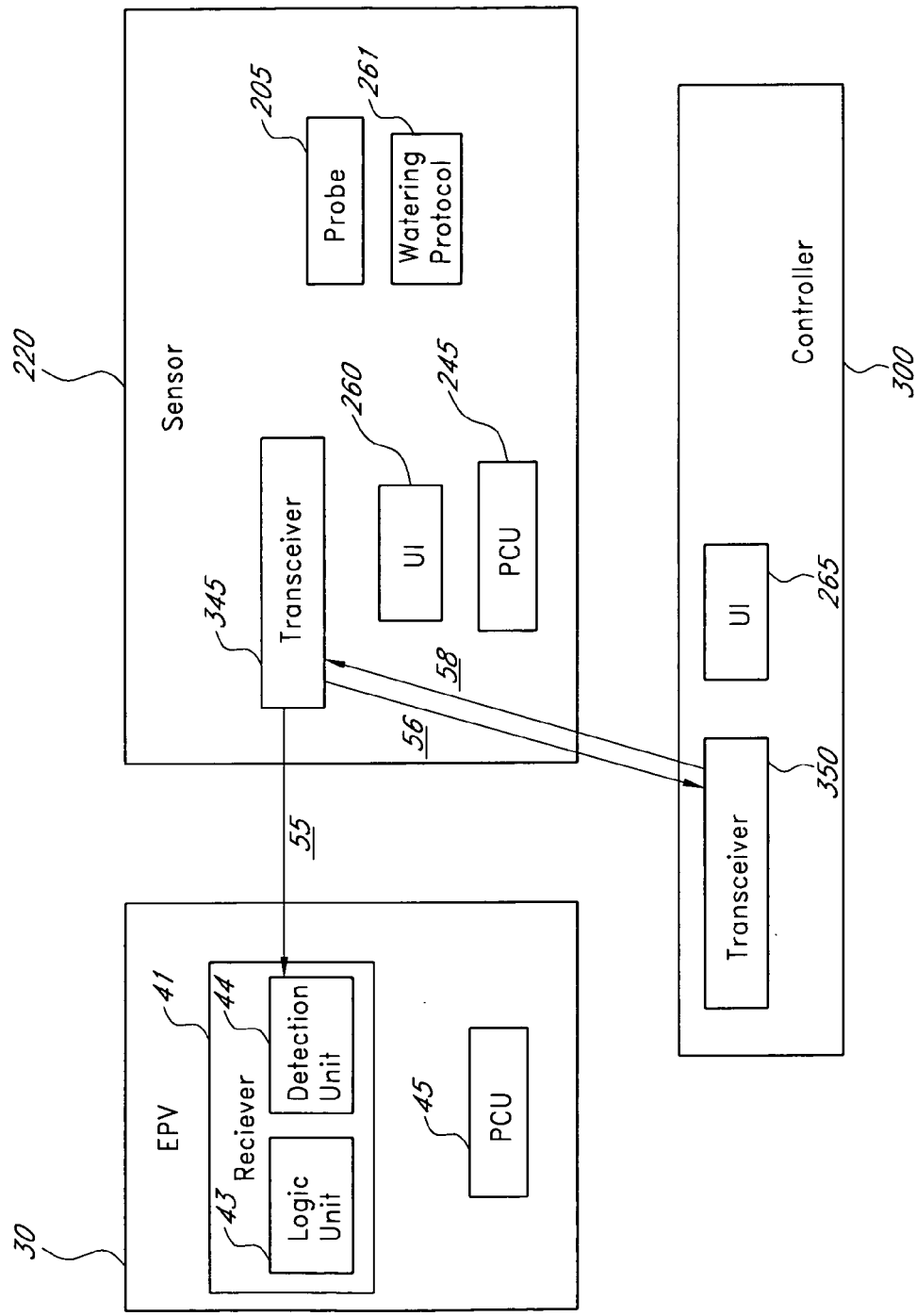
FIG. 5 is a schematic of an EPV and a sensor according to an alternative embodiment of the invention.

FIG. 5 depicts another embodiment of a low power monitoring and watering system, comprising sensors 220, EPVs 30, and a controller 300. In this embodiment, the sensor includes a transceiver 345, a probe 205, a watering protocol 261, a user interface 260, and a PCU 245 that can control the powered and unpowered states of the components of the sensor. The transceiver 345 sends wireless information signals 56 to the controller 300, which includes a second transceiver 350 and a second user interface 265. The transceiver 350 can send wireless signals 58 to the first transceiver 345 to allow modification of the watering protocol 261. The sensor's transceiver 345 sends wireless signals 55 to the EPV 30, as discussed above. The EPV 30 includes a PCU 45 for conserving power and a receiver 41 for receiving the signals 55. As will be appreciated by one of skill in the art, any of the elements (the sensor, EPV or controller) can contain a PCU that can control componentry of the element and thereby reduce power consumption.

In some embodiments, it is desirable to ensure that not all of the EPVs are activated at once, because it would draw too much water overall and reduce water pressure. Thus, methods or devices for sequentially activating the EPVs are desirable. In one embodiment, this is achieved by employing solar cells on all of the sensors 220 or all of the valves 30 (or both). The solar cells are the type often used on front door lights, which turn on only at night and not in daylight hours. These solar cells are configured detect the moment of a particular transition across a sunlight threshold. Importantly, all of the solar cells in the irrigation system will detect the transition at the same time, because they are all exposed to the same sunlight conditions. Thus, each of the stations 10 preferably times its watering activation with reference to the sunlight transition moment detected by the solar cells. Also, each of the various stations 10 is assigned a priority rank. For example, a first station has a priority rank "1" and a second station has a priority rank "2". When the solar cells detect the sunlight transition, all of the stations ranked "1" are eligible to begin watering if their sensors 220 detect environmental conditions that require watering under the applicable watering protocol 261. After a certain period of time (e.g., 45 minutes, which is typically longer than any particular sprinkler would be on), the stations ranked "2" are eligible to begin watering if their sensors 220 so require. As will be appreciated, stations can be ranked "3", "4", and so on.

The sensors 220 can be configured to only send the signals 55 to the EPV 30 of the same station 10. For example, the power of the transmitter 50 can be so low that the signal 55 won't reach other EPVs. Alternatively, each sensor/EPV pair (or grouping of multiple sensors with one EPV) can be configured to communicate via a unique type of signal 55 (e.g., with signal encoding or the like). In this way, the signals 55 will only be acted upon by the intended EPVs.

C. Power Conservation

The EPVs and sensors can be solar-powered, but are also preferably battery-powered or contain a battery. In a preferred embodiment, the monitoring and watering system is configured or used so as to minimize power consumption of the various parts of the system. Power saving aspects, such as a power control unit, can be employed at the sensor 220, the controller 300, the electrically powered valve 30, and some combination thereof. The PCUs can control power to each element as a whole, or to components thereof.

A conventional wireless receiver consumes a great deal of power because the receiver continually monitors for wireless commands. If the receiver is powered by batteries, the battery power would be exhausted in a relatively short period of time, such as a week or less. The power control units 45 and 245 overcome this limitation. For example, in one embodiment, the power control unit 45 can allow the receiver 41 to function for six months to as much as 3 years. In one embodiment, the power control unit may allow a receiver to function for up to twenty times longer than a receiver without the power control unit.

Three methods to conserve power are (1) repeatedly toggling power to the system components so that the powered states overlap, (2) dynamically varying the amount of power used by the EPV 30 to move the flow restrictor 38, and (3) substantially synchronizing scheduled powered states of the communicating components. One, two, or all three of these power savings methods can be employed in systems of this invention. Other power savings methods can also be employed. It will be appreciated that these methods can overlap.

1. Toggling

In one embodiment, the power control unit 45 generally operates by toggling the EPV 30 (or perhaps just the detection unit 44 of the receiver 41) between powered and unpowered states, to reduce power consumption. This toggling preferably occurs in a repeating temporal cycle. Likewise, the power control unit 245 toggles the sensor 220 (or perhaps just the transmitter 50 and probe 45) between powered and unpowered states, preferably in a repeating temporal cycle. While cyclic toggling is preferred, the toggling need not be cyclic. The toggling causes time overlaps between the powered states of the sensor 220 and EVP 30, within which the wireless signals 55 are sent and received.

In cyclic toggling embodiments, the EPV 30 is preferably configured to remain in its unpowered state for a duration that is less than the duration that the sensor 220 sends the signal 55 when the sensor is in its powered state. This configuration ensures repeated time overlaps between the powered states of the EPV 30 and sensor 220, and it also ensures that the signal 55 will be received at the EPV. For example, the transmitter 50 can be configured to send the signal 55 for one full second, and the detection unit 44 can be configured to cyclically toggle on for 0.1 seconds and toggle off for 0.4 seconds, making it impossible to miss the signal 55. It will be appreciated that it may not be necessary for the sensors 220 to toggle to the powered states very often. For example, the sensors 220 can be configured to be powered once an hour, or even once or only a few times every day.

In cyclic toggling embodiments, the frequencies of the toggling cycles may depend to some extent upon the desired lifespan of the batteries and the charge currently in the batteries. For example, if the batteries 47 are desired to last for a year, but they only supply one week's worth of continuous activity of the detector unit 44, then the power control unit 45 can be set to power the detector unit approximately $\frac{1}{52}$ of the duration of the toggling cycle. The detection unit 44 needs only a small fraction of a second to receive a wireless signal 55. For example, the detection unit 44 could be on for $\frac{1}{50}$ of each second, or 20 milliseconds. This might be a sufficient time to detect the signal 55, saving a significant amount of power.

In some embodiments, the power control unit 45 only toggles power to the detection unit 44, leaving other components such as the logic unit 43 off continuously. These other components are powered only when the detection unit 44 detects a wireless signal 55 or 57. Upon a signal detection event, these other components can remain powered until any action to be taken is completed. Similarly, the sensor 220 can power the user interface 260 only when the user begins programming the sensor.

The EPV 30 can be configured to return to its power saving mode after a wireless signal 55 has been detected and the signal ceases. That is, while the detection of a signal 55 results in the power control unit 45 allowing the EPV to use more power, the cessation of the signal can cause the power control unit to return the EPV 30 to its low power consumption state. In some embodiments it may be desirable to include a delay following the cessation of the signal 55, in case another signal is likely to follow. For example, it may be efficient to leave the EPV 30 fully and continuously powered, even after a signal 55 to open the flow restrictor 38 has stopped being transmitted, as it may be likely that a signal to stop the flow of water is soon to follow.

Figure 6:
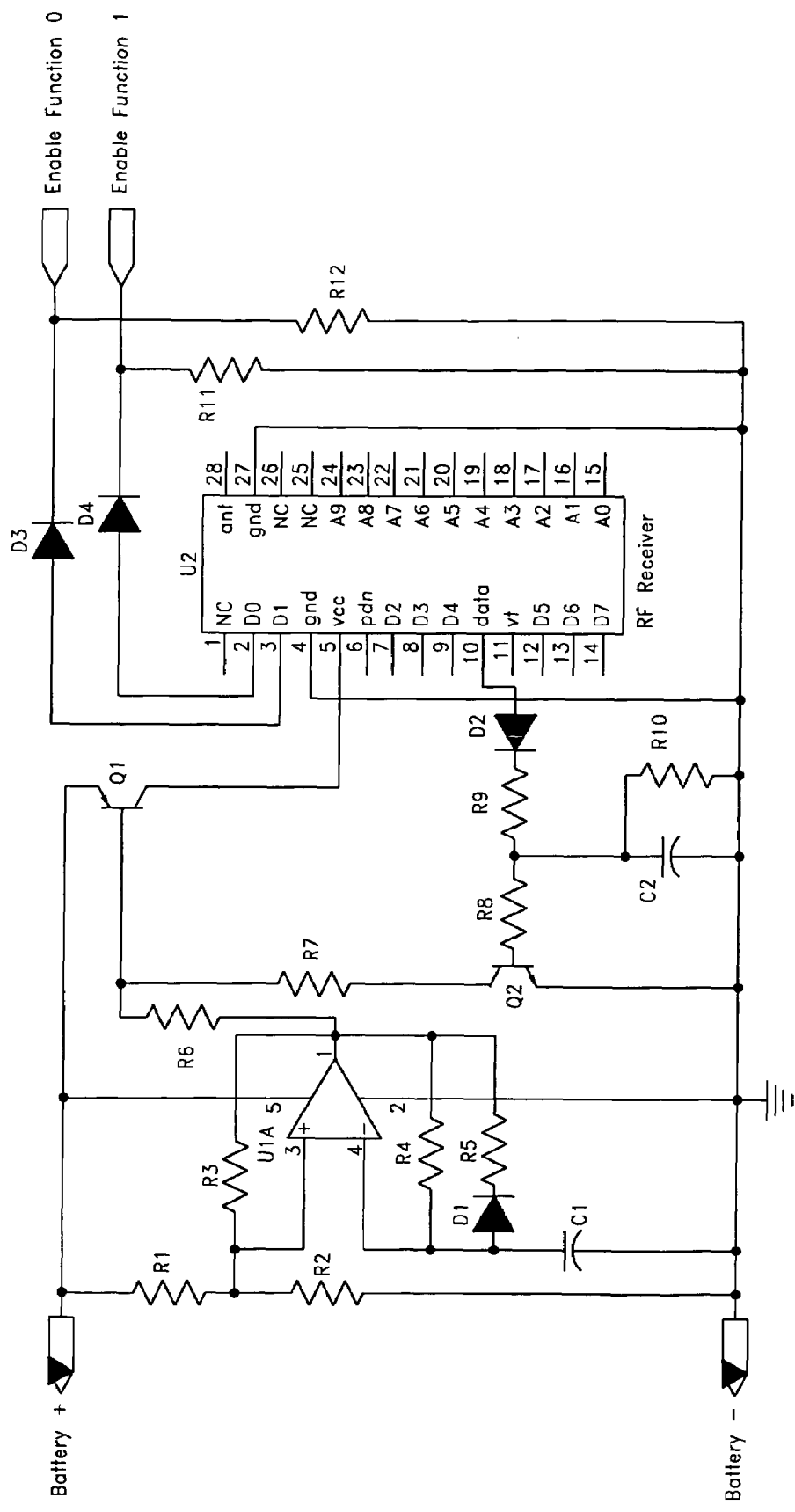
FIG. 6 is a circuit diagram of an embodiment of a power control unit.
Figure 7A:
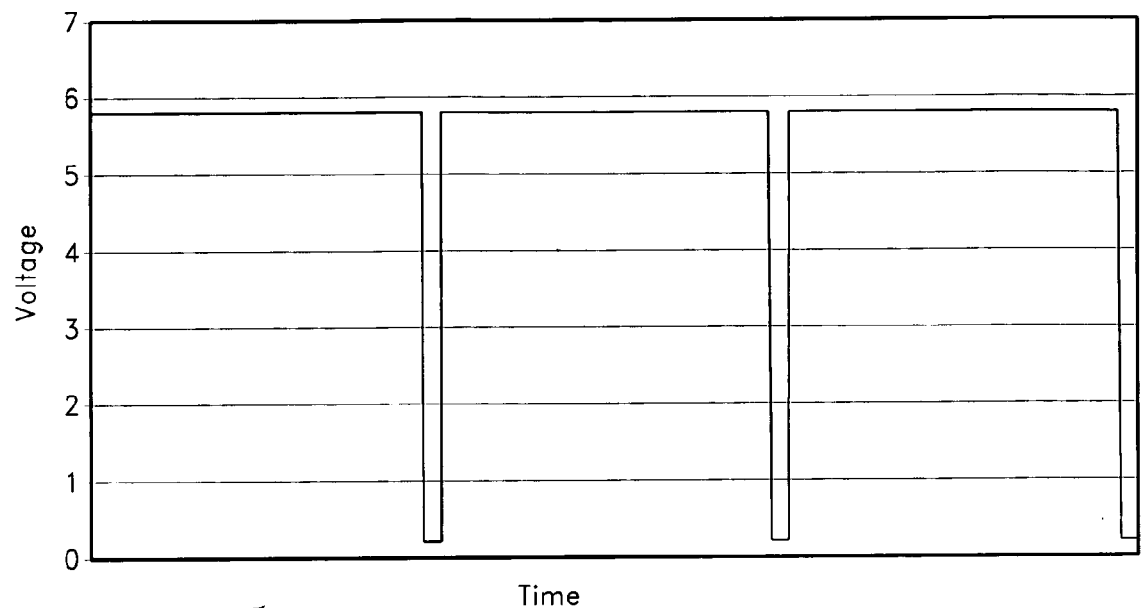
FIG. 7A is a graph of the voltage at the output pin 1 of the op-amp of FIG. 6.
Figure 7B:
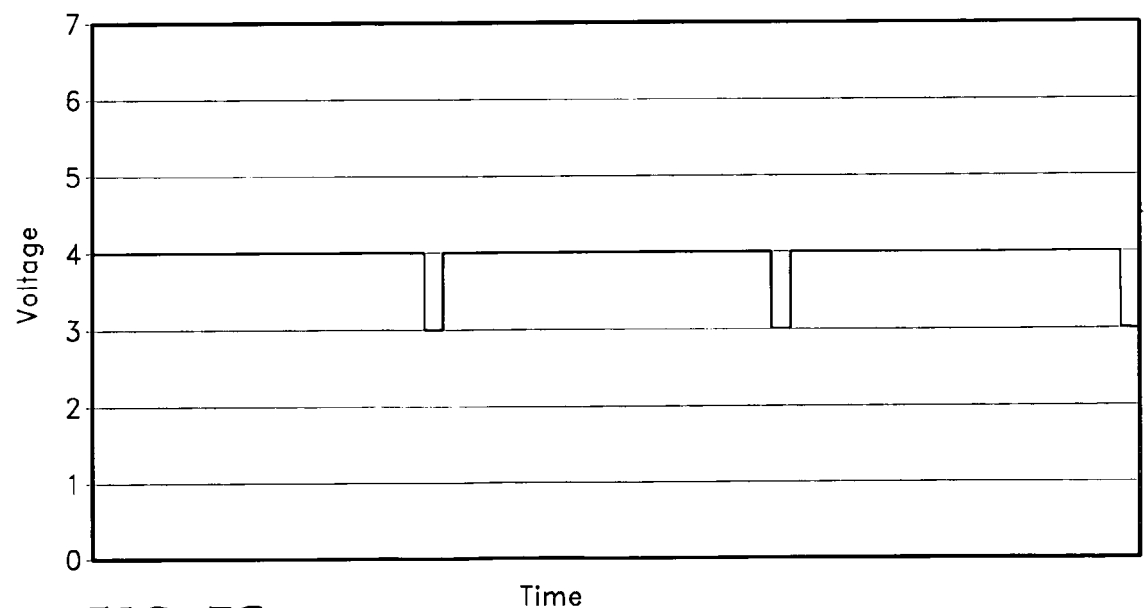
FIG. 7B is a graph of the voltage at the non-inverting input pin 3 of FIG. 6.
Figure 7C:
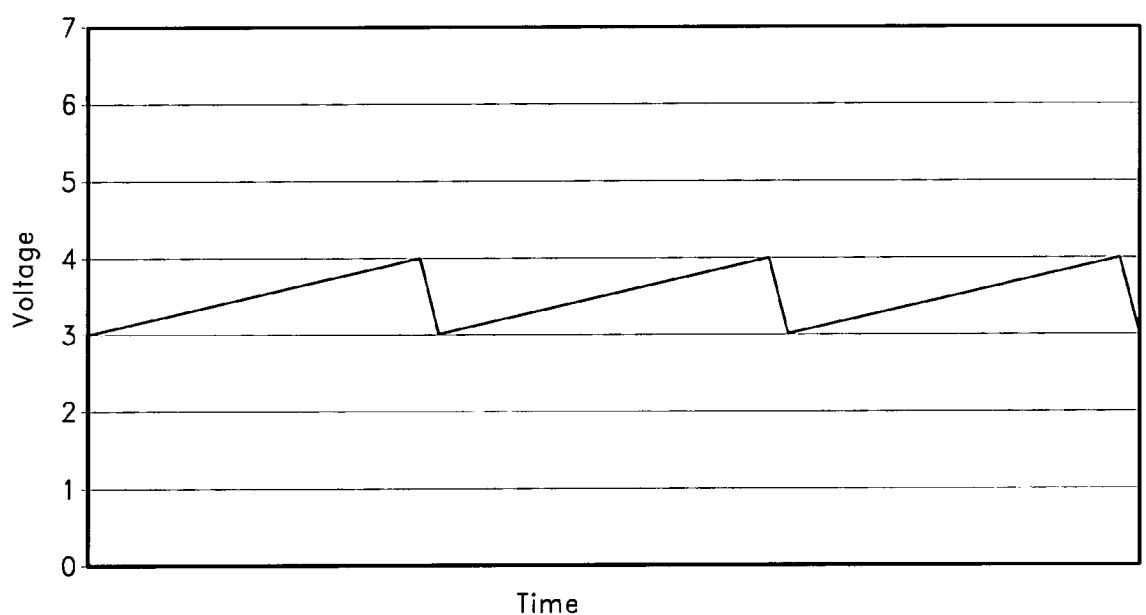
FIG. 7C is a graph of the voltage at the inverting input pin 4 of FIG. 6.

In one aspect, the power control unit 45 employs an op-amp to switch the detection unit 44 on and off, repeatedly, in order to conserve battery life. A preferred embodiment of a power control unit 45 is shown in FIG. 6. The power control unit preferably comprises a very low power bi-stable oscillator. The oscillator comprises an op-amp U1A, a plurality of resistors R1, R2, R3, R4 and R5, a capacitor C1, and a diode D1. The op-amp U1A has a non-inverting input pin 3, an inverting input pin 4, and an output pin 1, among others. Resistors R1, R2, and R3 form a voltage divider, which provides one of two voltages to the non-inverting input pin 3 of the op-amp U1A. The resistor R3 provides hysteresis to stabilize the op-amp. While the receiver is a RF receiver in this embodiment, other communications methods could also be used in place of RF communications. FIGS. 7A, 7B, and 7C illustrate the voltages at the pins of the op-amp. FIG. 7A is the voltage at the output pin 1 of the op-amp. FIG. 7B is the voltage at the non-inverting input pin 3, and FIG. 7C is the voltage at the inverting input pin 4.

The voltage at non-inverting pin 3 is higher when the voltage at the output pin 1 is high because of the effects of the voltage divider. The capacitor C1 charges, gradually increasing the voltage at the inverting pin 4 until the voltage equals the voltage of the non-inverting pin 3. The op-amp U1A then changes the output of pin 1 to its low voltage, $V_{ol}$. Because there are no capacitors connected to the non-inverting pin 3, and thus no time delay, the low output on pin 1 immediately reduces the voltage to pin 3. The low output voltage also causes current to flow though the resistors R4 and R5 and lowers the voltage across the capacitor C1. Voltage across a capacitor cannot change immediately, so the voltage at the inverting input 4 gradually decreases. When the voltage at pin 4 decreases to the voltage of the non-inverting pin 3 the output pin 1 of the op-amp U1A rises to the op-amp's high voltage, $V_{oh}$. The high output of the output pin 1 causes current to flow though the resistor R4 and raises the voltage across the capacitor C1. As the capacitor charges, the voltage at the inverting input pin 4 increases. When the voltage at the inverting pin 4 equals the voltage of the non-inverting pin 3, the output pin 1 switches to $V_{ol}$, thus repeating a continuous cycle. The non-inverting duration ($T_p$) is proportional to the time constant determined by the resistance of resistor R4 multiplied by the capacitance of capacitor C1. The inverting duration ($T_n$) is proportional to the time constant of the combined resistance of resistors R3 and R4 in parallel multiplied by the capacitance of capacitor C1. This time constant is defined as $((R4*R3)/(R4+R3))*C1$.

When the output pin 1 of op-amp U1A is high, a transistor Q1 has no base current and does not conduct. This turns the power off to the RF receiver U2. When the output pin 1 of the op-amp U1A is low, the transistor Q1 has base current conducting through the resistor R6 and turns on such that the voltage at the collector of the transistor Q1 is close to the voltage of Battery+. This turns the power on to the RF receiver U2. As described above, $T_n$, the time that the RF receiver U2 receives power, is proportional to the time constant. In a preferred embodiment, $T_n$, is ⅟₂₀ of the total cycle time, $T_n+T_p$. The RF receiver (and perhaps the entire EPV 30) is powered preferably less than about 10%, more preferably less than 5%, even more preferably less than 1%, and even more preferably less than 0.1% of its toggling cycle. The on and off duration can be further modified by making the resistors R1 and R2 unequal to form an additional voltage divider.

The RF receiver U2 outputs a signal on the data pin 10 if there is a RF command being received. When the output of data pin 10 is high, current conducts through a diode D2, charging the capacitor C2. When the voltage across the capacitor C2 is above 0.6 volts, current conducts through a resistor R8 and the base-emitter junction of a transistor Q2. When current conducts through the base-emitter junction of the transistor Q2, the transistor Q2 turns on and the voltage at the collector is close to ground. This causes current to flow through a resistor R7 and the transistor Q1 base-emitter junction thus holding the transistor Q1 in the on state, applying power to the RF receiver U2. This performs the function of applying power to the RF receiver U2 while the command is decoded and executed. In this embodiment, the RF receiver U2 receives the RF data and also decodes it. When the RF receiver no longer is receiving a signal, the data pin 10 goes low and the control of power to the RF receiver U2 is restored to the bi-stable oscillator.

When the RF receiver U2 has decoded a command it outputs the results on data pin D0, pin 2 of RF receiver U2, and/or data pin D1, pin 3 of the RF receiver U2. If the function1 port is to be enabled, then the RF receiver U2 outputs a high voltage on the data pin D0 (pin 2). If the function0 port is to be enabled it outputs a high voltage on the data pin D1 (pin 3). A high voltage on the data pin D0 (pin 2) will cause current to flow through the diode D4 and pull the enable function1 port to a high voltage. A high voltage on the data pin D1 (pin 3) will cause current to flow through the diode D3 and pull the enable function0 port to a high voltage. In another embodiment of a power control unit seen in FIG. 8, the power control unit preferably comprises an op-amp U1A, a plurality of resistors R1, R2, R3, R4 and R5, and a capacitor C1 to form a very low power bi-stable oscillator similar to the embodiment above.

Figure 8:
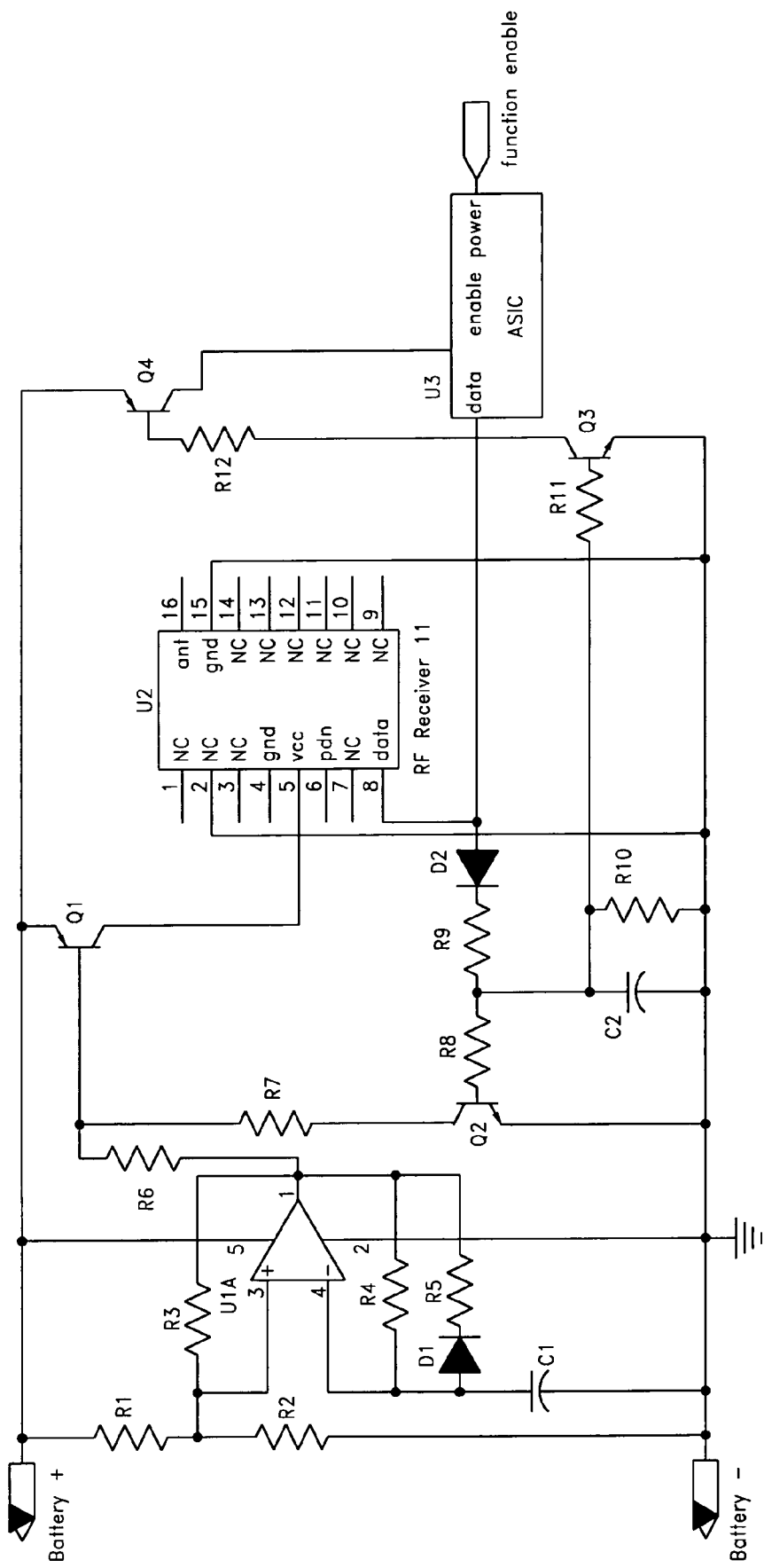
FIG. 8 is a circuit diagram of another embodiment of a power control unit.

When the output pin 1 of the op-amp U1A is high, a transistor Q1 has no base current and does not conduct. This turns the power off to a RF receiver U2. In this embodiment, the RF receiver U2 serves only as a receiver. The RF receiver U2 passes the data to an ASIC U3 for decoding as seen in FIG. 8. When the output pin 1 of the op-amp U1 is low, the transistor Q1 has base current conducting through the resistor R6 and turns on such that the voltage at the collector is close to Battery+. The high collector voltage turns the power on to the RF receiver U2.

The output of the RF receiver U2 on data pin 8 is used to maintain power to the RF receiver U2 while the command is being received. The RF receiver U2 outputs a signal on data pin 8 if there is an RF command being received. When the output on the data pin 8 is high, current conducts through the diode D2, charging the capacitor C2. When the voltage across the capacitor C2 is above 0.6 volts, current conducts through a resistor R8 and the base-emitter junction of a transistor Q2. The transistor Q2 turns on and the voltage at the collector is close to ground. This causes current to flow through a resistor R7 and the transistor Q1 base-emitter junction. Thus, the transistor Q1 is held in the on state, applying power to the RF receiver U2 while the command is decoded.

The output of the RF receiver U2 on data pin 8 is also used to maintain power to the ASIC U3 while the command is being decoded. When the voltage across the capacitor C2 is above 0.6 volts, current conducts through a resistor R11 and the base-emitter junction of a transistor Q3. The transistor Q3 turns on and the voltage at the collector is close to ground. This causes current to flow through a resistor R12 and the transistor Q3 base-emitter junction thus holding a transistor Q4 in the on state, applying power to the ASIC U3. When the ASIC U3 has decoded a command it and determines that the command is a valid command, it outputs a high voltage on the function enable port which turns the power on to the electronics to implement the appropriate functions. The data pin 8 of the RF receiver U2 is turned off, and the power cycle is restored to the control of the bi-stable oscillator.

Skilled artisans will understand from the teachings herein, in particular FIG. 6 and associated text, how to create a suitable power control unit 245 of a sensor 220.

In a preferred embodiment, the temporal overlaps between the sensor 220 and the valve 30 are achieved by selecting a frequency of a power cycle for one part (e.g., the EPV) so that the part will be powered at least once during the length of a single powered state for a second part (e.g., sensor). For example, if the power in an EPV 30 is controlled by a PCU 45 so that the EPV is powered three times a second (and thus can detect a signal 55 three times a second), then the PCU 245 can power the sensor 220 for at least ⅓ of a second, such as 0.5 seconds, or more preferably a full second. Preferably, the sensor 220 is powered and transmits the signal 55 for a duration that is long enough for the EPV 30 to detect the signal at least once, although more detections are preferred. In one embodiment, each component 30, 220 is in its powered state preferably less than 50%, more preferably less than 40%, more preferably less than 30%, more preferably less than 20%, more preferably less than 10%, more preferably less than 5%, more preferably less than 1%, more preferably less than 0.5%, and even more preferably less than 0.1% of the cycle period.

2. Dynamic Varying of Power to EPV

Figure 9:
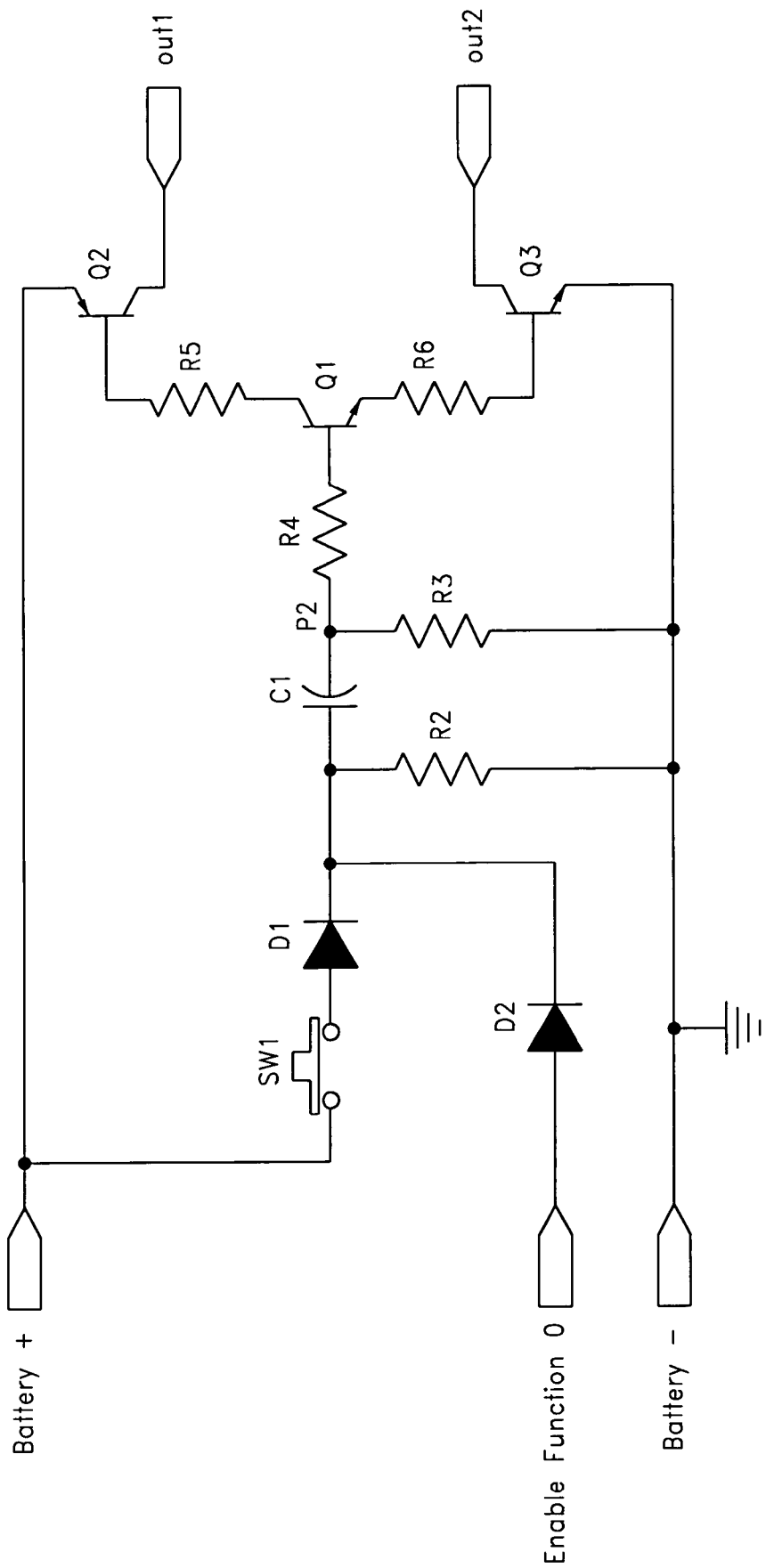
FIG. 9 is a circuit diagram of another embodiment of a power control unit.

Another way to reduce power consumption of the EPV 30 is to dynamically adjust the required voltage for moving the flow restrictor 38. An exemplary circuit is shown in FIG. 9, whereby the power control unit 45 varies the voltage that is applied to the flow restrictor 38, during such movement. In one embodiment, the power control unit applies a constant voltage across the flow restrictor 38 for a period of time sufficient to overcome the initial friction force opposing the beginning movement of the flow restrictor. Then, once the flow restrictor 38 begins moving, the power control unit 45 decreases the voltage for the next period of time while the flow restrictor is moving. This process lowers the total amount of energy needed to open or close the flow restrictor 38.

When the sensor 220 sends a command signal 55 to move the flow restrictor 38, the anode of a diode D1 is connected to Battery +. The diode D1 will go into conduction and the voltage at the cathode of diode D1 will rise to the "breakover" voltage of the diode (e.g., 0.6 volts). Similarly, when the voltage at enable function 0 goes high, a diode D2 will go into conduction and the voltage at the cathode of the diode D2 will rise to 0.6 volts. When voltage at the cathode of either diode D1 or D2 is high, the voltage across a capacitor C1 changes. The voltage across the capacitor C1 cannot change instantaneously, so current flows through a resistor R4 and the emitter-base junction of a transistor Q1. The transistor Q1 turns on and saturates the collector-emitter junction voltage. Current flows through a resistor R5 and the emitter-base junction of a transistor Q2. Additionally, current flows through a resistor R6 and the emitter-base junction of a transistor Q3. This current is initially enough to saturate Q2 and Q3, thus effectively connecting Out1 and Out 2 to Battery+ and Battery− respectively.

As the capacitor C1 charges, the voltage across the resistor R4 decreases. When the transistor Q1 is no longer saturated, the current through the resistors R5 and R6 will fall, which will cause the transistors Q2 and Q3 to no longer be saturated. The voltage at out1 will slowly drop from Battery+ and the voltage at out2 will slowly increase from battery−. This effectively decreases the voltage between out1 and out2, which is the voltage across the flow restrictor 38. As the voltage across the flow restrictor 38 decreases, the power consumed by the flow restrictor decreases. When the transistors Q1, Q3, and Q4 are turned off, the power is disconnected from the flow restrictor 38.

Figure 10A:
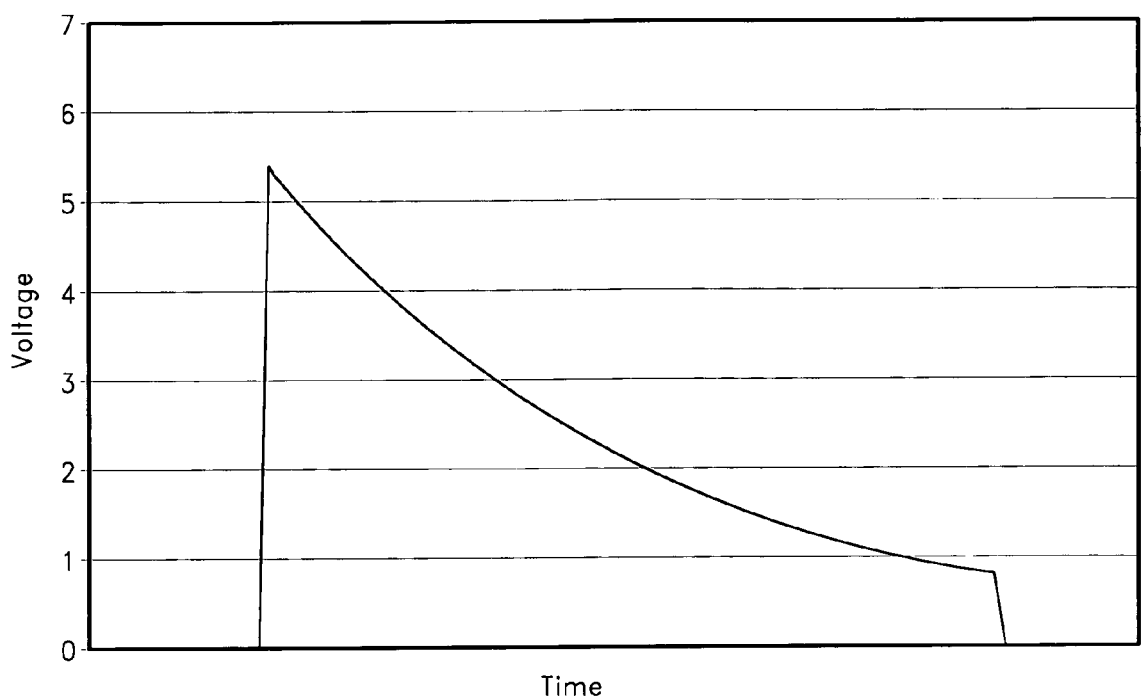
FIG. 10A is a graph that illustrates the voltage for point p2 of FIG. 9.
Figure 10B:
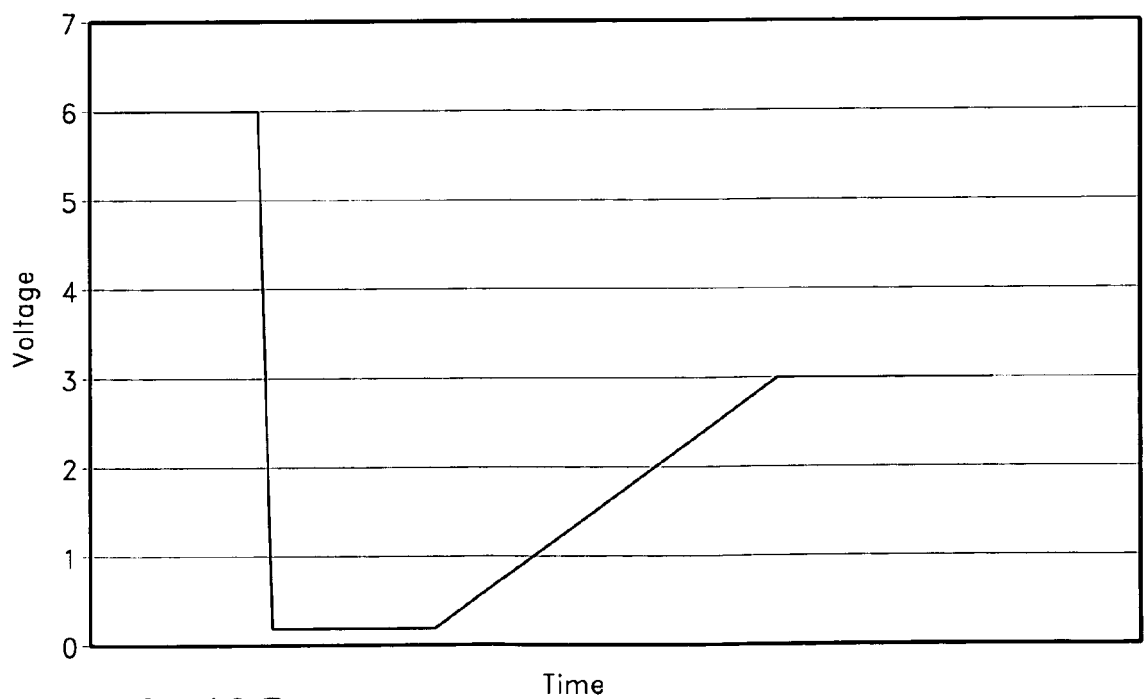
FIG. 10B is a graph of the voltage at out1 of FIG. 9.
Figure 10C:
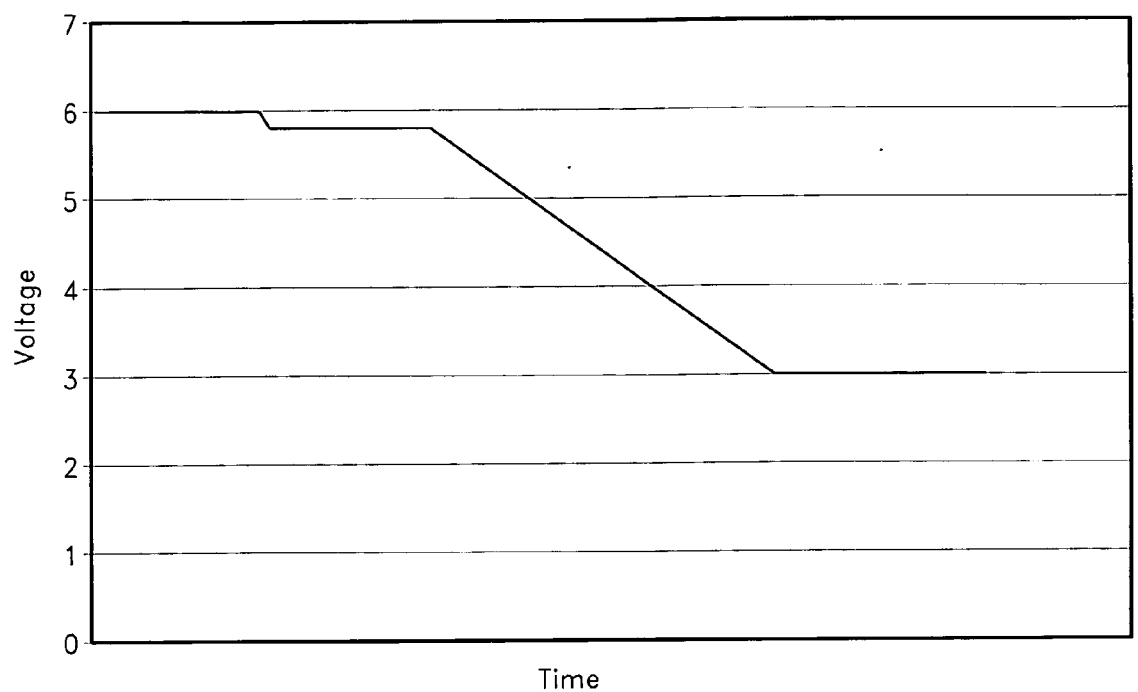
FIG. 10C is a graph of the voltage at out2 of FIG. 9.
Figure 10D:
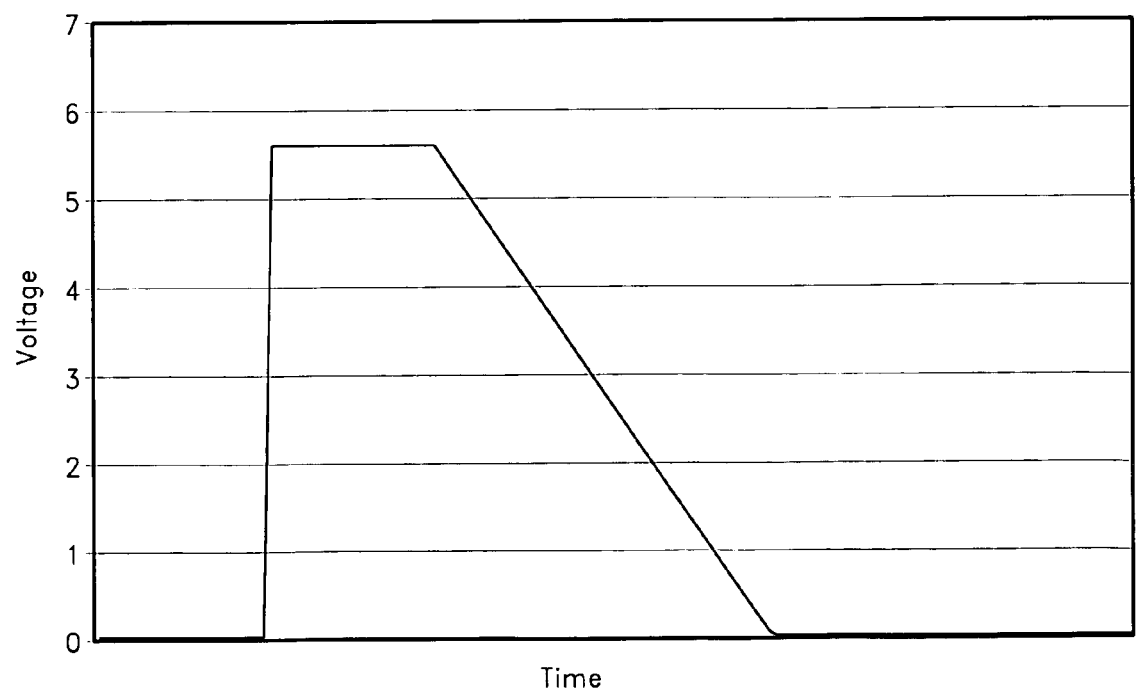
FIG. 10D is a graph showing that the voltage across the ports out1 and out2 of FIG. 9 go to zero when the voltage at point p2 decreases below 1.4 volts.

FIGS. 10A, 10B, 10C and 10D illustrate the process of slowly decreasing the voltage across the flow restrictor 38. The numbers in these graphs are merely suggestive of actual numbers, and will vary depending on component values. In FIG. 10A, the graph illustrates the voltage for point p2, which is at the node of the resistors R3 and R4 and the capacitor C1. FIG. 10B is a graph of the voltage at out1. FIG. 10C is a graph of the voltage at out2. Note that when the voltage at P2 decreases below 1.4 volts, there is insufficient voltage to turn on the transistors Q2 and Q3, and the voltage to the ports out1 and out2 is equal. As illustrated in FIG. 10D, the voltage across the ports out1 and out2 goes to zero when the voltage at point p2 decreases below 1.4 volts. The voltage varying process involves the application of full voltage across the flow restrictor 38 to overcome the initial friction force and begin moving the flow restrictor, followed by a decrease of the voltage while the flow restrictor 38 is moving, to minimize the power consumption.

3. Synchronization

In another embodiment, timer elements can be provided to permit substantial synchronization of the powered states of the sensor 220 and EPV 30. For example, both devices can cyclically toggle at the same frequency so that the powered states both begin at the top of each second and both last for 0.1 seconds. Advantageously, the sensor and EPV are both unpowered for the majority of the cycle. As another example, which does not involve cyclic toggling, a transmitter 50 of a sensor 220 and a receiver 41 of an EPV 30 can remain unpowered the entire day except for between 1:00 a.m. and 1:01 a.m., between 7:00 a.m. and 7:01 a.m., and between 11:00 and 11:01 p.m., during which times both the transmitter and receiver are powered. Skilled artisans will understand that a virtually unlimited number of different synchronized schedules are possible.

In another embodiment, synchronization occurs based on a user command that all devices (30, 220) are to be powered. Synchronization schedules can be based on a solar cell detecting that the level of sunlight has crossed (either raised above or dipped below) a set threshold.

Synchronization need not be between all parts in the system at the same times. For example, in embodiments having sensors 220, EPVs 30, and a controller 300, substantial synchronization of the powered states of the sensor and controller can occur at a first set of times, while substantial synchronization of the powered states of the EPV and the controller occur at a second set of times and substantial synchronization of the powered states of the EPV and the sensor occur at a third set of times. Alternatively, all of the devices 30, 220, 300 can be substantially synchronized together. Synchronized systems can also be used where there is no controller 300.

In some embodiments, synchronization can be used to allow for a single controller 300 to effectively monitor and identify numerous sensors 220 and selectively control numerous electrically powered valves 30. For example, a first sensor can be programmed, via a PCU, to send a signal, at 0:00, 2:00, and 4:00 each day. A second sensor can be programmed to send a signal at 0:05, 2:05, and 4:05 every day. A controller 300 or electrically powered valve 30 can be programmed to receive information or commands at 0:00, 0:05, 2:00, 2:05, 4:00, and 4:05. The controller or electrically powered valve can identify which sensor is sending the information based on the time of the signal (e.g., 2:00 vs. 2:05).

D. Controller

In some embodiments, the controller 300 provides a separate location for data from the sensors to be viewed and analyzed. The controller can also provide a single location at which the user can adjust the watering protocols 261 for the stations 10. In one embodiment, the controller 300 is implemented in a conventional home computer or laptop.

In one embodiment, the controller 300 is programmable by a user interface 265, for example, via a keypad and a display or a link to a computer. In another embodiment, the controller includes a computer running system-specific software, as well as a communication link to send signals to the EPVs 30 and sensors 220. Through the user interface 265 the user can set up the intelligent valve system, identify which plants are watered by which valves, and monitor the detected environmental conditions and watering. In one embodiment, the controller 300 includes preset schedules for different types of plants, to help the user prepare the watering protocols 261. In one embodiment, the user can choose presets from a set of templates like deciduous tree, perennial flower, marigolds, etc., or will be able to create their own watering schedules if a given template is not appropriate.

The controller 300 can be configured to override watering commands from the sensors 220 in view of, e.g., weather forecasts, the types of plants being watered, soil quality, or other factors that one of skill in the art will appreciate as relevant to watering plants. As will be appreciated by one of skill in the art, this may be predictive or a concurrent activity. For example, feedback from the sensors 220 may constantly be adjusting the watering activity. Alternatively, data collected throughout a time period by the sensors may be compiled together to obtain an environmental profile at each sensor over the past time period. Thus, for example, if it has been raining for the past day, and the plants themselves have taken in a substantial amount of water, the controller can take this into consideration, even if the sensor environment suggests that the immediate area is dry.

In one embodiment, the controller 300 is configured to allow for ready identification of the sensors 220 and/or the electrically powered valves 30. For example, to initialize an electrically powered valve (EPV) and a sensor, the user can bring them close (~1 foot) to the controller, where they can be identified in an identification step. As EPVs are identified or recognized by the controller, this information can be loaded into the software program. If the EPV has been seen before, its presets can be loaded and if this is the first time it has been seen, a new entry can be created for the EPV in the software. Once EPVs are initialized they can stay in the database until they have been deleted by the user. EPVs can have various identification tags (e.g. "Marigolds by the north wall") or descriptions (e.g., notes about the valve condition or the plants it is watering).

It will be appreciated by those skilled in the art that various omissions, additions, and modifications may be made to the methods and structures described above without departure from the scope of the invention. All such modifications and changes are intended to fall within the scope of the invention, as defined by the appended claims.

What is claimed is:

1. A method for wirelessly monitoring and watering an area, comprising:
providing a sensor configured to detect an environmental condition and transmit wireless signals associated with the detected condition;
providing an electrically powered valve configured to receive the signals and control flow to a watering unit in the area;
toggling componentry of the sensor between powered and unpowered states;
toggling componentry of the valve between powered and unpowered states;
causing time overlaps of the powered states of the sensor and the valve; and
sending the signals from the sensor to the valve during the time overlaps.

2. The method of claim 1, wherein toggling comprises repeatedly toggling in a temporal cycle.

3. The method of claim 2, wherein toggling componentry of the valve comprises toggling a wireless signal receiver of the valve between powered and unpowered states, the receiver being toggled with a sufficient frequency so that the receiver is powered at least once during each powered state of the sensor.

4. The method of claim 2, wherein the componentry of the sensor and valve are toggled at substantially the same frequency.

5. The method of claim 2, further comprising substantially synchronizing the powered states of the sensor and the valve.

6. The method of claim 1, wherein toggling componentry of the sensor between powered and unpowered states comprises toggling a wireless signal transmitter between powered and unpowered states.

7. A system for wirelessly monitoring and watering an area, comprising:
one or more electrically powered sensors configured to be deployed in the area, each sensor comprising:
a probe configured to measure an aspect of the sensor's environment;
a transmitter configured to transmit a wireless signal containing measurements received from the probe; and
a sensor power control unit configured to repeatedly toggle componentry of the sensor between powered and unpowered states; and
one or more electrically powered valves configured to be connected to a network of irrigation conduits deployed in the area, each valve comprising:
a fluid inlet;
a fluid outlet, a fluid flow path being defined between the inlet and outlet;
an electrically actuated flow restrictor movable to selectively open or close the flow path;
a receiver configured to receive the wireless signals sent from the one or more sensors; and a valve power control unit configured to repeatedly toggle componentry of the receiver between powered and unpowered states;

wherein at least one sensor power control unit and at least one valve power control unit are configured to produce overlaps of the powered states of their associated sensor and valve so that the valve's receiver can receive wireless signals from the sensor's transmitter during the overlapping powered states.

8. The system of claim 7, wherein each valve is configured to receive and act upon wireless signals only from one or more sensors located within a subregion associated with the valve, the subregion being a portion of the area.

9. The system of claim 7 wherein the sensor power control unit is configured to supply power with a sufficient frequency so that the sensor is powered at least once during a duration of time that the valve power control unit supplies power to the valve.

10. The system of claim 7 wherein the valve power control unit is configured to supply power with a sufficient frequency so that the valve is powered at least once during a duration of time that the sensor power control unit supplies power to the sensor.

11. The system of claim 7, further comprising a controller comprising:
a transmitter configured to send wireless control signals to the one or more valves, each valve being configured to move its flow restrictor based on the control signals; and
a user interface configured to display information concerning at least some of the valves and/or sensors, and to receive user commands for control of the system.

12. The system of claim 7, wherein a sensor's power control unit is configured to repeatedly toggle the sensor between its powered and unpowered states in a temporal cycle, and to keep the sensor in its powered state less than about 50% of a duration of the cycle.

13. The system of claim 12, wherein the sensor's power control unit is configured to keep the sensor in its powered state less than about 30% of the duration of the cycle.

14. The system of claim 7, wherein a valve's power control unit is configured to repeatedly toggle the valve between its powered and unpowered states in a temporal cycle, and to keep the valve in its powered state less than about 1% of a duration of the cycle.

15. The system of claim 14, wherein the valve's power control unit is configured to keep the valve in its powered state less than about 0.01% of the duration of the cycle.

16. The system of claim 7, wherein each probe is configured to measure at least one aspect selected from the group consisting of soil moisture, temperature, solar radiation, wind, and solar radiation received over a period of time.

17. The system of claim 7, wherein each valve is configured to position its associated flow restrictor at any of a plurality of positions between a completely closed position in which the fluid flow path is completely closed and a completely open position in which the fluid flow path is completely open.

18. The system of claim 7, wherein at least one sensor or valve further comprises a solar cell for collecting and storing solar energy for powering the sensor or valve.

19. The system of claim 7, wherein at least one of the sensor power control units toggles its associated probe between powered and unpowered states.

20. The system of claim 7, wherein at least one of the sensor power control units toggles its associated transmitter between powered and unpowered states.

21. The system of claim 7, wherein at least one of the valve power control units toggles a wireless signal detection unit between powered and unpowered states.

* * * * *